United States Patent [19]
Burson

[11] Patent Number: 6,101,827
[45] Date of Patent: Aug. 15, 2000

[54] TEMPERATURE COMPARISON CIRCUIT AND REFRIGERATION EXPANSION VALVE

[76] Inventor: Benard Burson, 3000 Skylark Dr., Austin, Tex. 78757

[21] Appl. No.: 09/436,028

[22] Filed: Nov. 8, 1999

[51] Int. Cl.[7] ..................................................... F25B 41/04
[52] U.S. Cl. ......................... 62/210; 62/224; 251/129.21; 318/641
[58] Field of Search ............................. 62/208, 209, 210, 62/211, 212, 222, 223, 224, 225; 236/92 B; 251/129.01, 129.08, 129.09, 129.1, 129.15, 129.16, 129.21; 318/638, 639, 641, 677, 678, 681, 686, 687; 374/183, 185

[56] References Cited

U.S. PATENT DOCUMENTS

| | | | |
|---|---|---|---|
| 2,449,437 | 9/1948 | Winchester et al. | 62/211 X |
| 3,391,620 | 7/1968 | Wellman, Jr. et al. | 340/228 R |
| 3,577,743 | 5/1971 | Long | 62/225 X |
| 4,333,317 | 6/1982 | Sawyer | 62/212 |
| 4,362,027 | 12/1982 | Barbier | 62/212 X |
| 4,614,327 | 9/1986 | Valbjørn et al. | 251/129.21 |
| 5,655,379 | 8/1997 | Jaster et al. | 62/210 |

*Primary Examiner*—Harry B. Tanner
*Attorney, Agent, or Firm*—Richard L. Huff

[57] ABSTRACT

Temperature comparison circuits which utilize two thermistors which are initially set up in a balanced bridge using NPN transistors and resistors. As temperature differences between the thermistors cause the bridge to become unbalanced, there is a current flow in which the voltage varies in magnitude and direction. The circuits are attached to electrical equipment which is sensitive to changes in magnitude and direction of voltage. The circuits find uses in controlling refrigeration systems, controlling heating and cooling systems, and performing diagnostic tests on mammals or devices which contain temperature differences between two separate points. The circuits may be used in cooperation with an expansion valve which is located in the tubing of a refrigeration system. The tubing is non-magnetic. There is a fixed magnetizable plate having a central orifice. There is a moveable magnetizable plunger having an end which may fit into the central orifice to create a closure of the valve or may be withdrawn from the central orifice to open the valve. The outside of the tube over the plate is wound with a line which is connected to the temperature-sensitive circuit. The outside of the tube over the plunger is wound with a line carrying constant voltage. As the circuit voltage changes in response to temperature differences between the thermistors, the polarity of the fixed plate varies and either attracts or repels the plunger.

15 Claims, 5 Drawing Sheets

TEMPERATURE COMPARISON CIRCUIT AND REFRIGERATION EXPANSION VALVE

BACKGROUND OF THE INVENTION

1. Field of the invention

This invention relates to electrical circuits which change the difference in temperature between two points into differences in magnitude and direction of voltage and to circuits which contain electrical equipment which is sensitive to changes in magnitude and direction of voltage.

2. Description of the related art

The prior art is aware of electrical devices which measure temperatures at two separated points with thermistors and which change any difference in temperature to an electrical current which operates to change a condition. Thus, U.S. Pat. No. 3,931,620 to Wellman, Jr., et al describes an alarm system which contains a bridge network containing a thermistor and a transistor. U.S. Pat. No. 5,655,379 to Jaster et al describes a refrigerant control device which comprises a pair of thermistors. This control device is operated in dependence upon the current generated due to a difference or equality of temperatures which, in turn, is dependent upon whether one thermistor is in contact with the refrigerant liquid and one thermistor is in contact with the refrigerant vapor or whether both thermistors are in contact with the refrigerant vapor. In order for the Jaster et al circuit to be operative, the thermistors must be inside the phase separator of a refrigeration system, thus making retrofitting and field installation difficult and expensive. The Jaster et al circuit is not a true resistance type bridge circuit. Also, in the Jaster et al device, the voltage of current flow in a single direction may be changed, but reversal of current direction is not possible.

SUMMARY OF THE INVENTION

It is an object of the present invention to provide simple, yet accurate, circuits which are suitable for a broad scope of uses in which temperature differences between two points can be used to automatically control an operation or the knowledge of the temperature difference between two points can be useful. Another object of the present invention is to provide an expansion valve for a refrigeration system which may be used in combination with these circuits.

One circuit of the present invention comprises connectors to supplies of positive and negative voltage; a first and second thermistor coupled to the connectors; corresponding first and second high-gain NPN transistors coupled between the thermistors and the positive connector; a potentiometer coupled between the first and second NPN transistors and also coupled to the negative connector; corresponding connection points between the NPN transistors and the potentiometer; and corresponding lines running from the connection points to a piece of electrical equipment which is sensitive to a change in the magnitude and direction of voltage.

A second circuit of this invention comprises connectors to supplies of positive and negative voltage; a first and second thermistor coupled to the connectors; corresponding first and second high-gain NPN transistors coupled between the thermistors and the positive connector by corresponding first and second lines; corresponding power resistors coupled between the NPN transistors and the negative connectors; corresponding connection points between the NPN transistors and the power transistors; corresponding lines running from the connection points to a piece of electrical equipment which is sensitive to a change in the magnitude and direction of voltage; corresponding fixed-value resistors coupled between points on the corresponding first and second lines which are between the thermistor and the NPN transistor and the corresponding connection points.

The circuits of the present invention are suitable for a wide variety of systems which utilize electrical devices which are sensitive to changes in the magnitude and direction of voltage which is caused by a difference between temperatures at two separate points.

An expansion valve for refrigeration systems is also part of this invention. The valve is inside a non-magnetizable tubing for refrigerant fluid. A magnetizable plate having a central orifice is set in a fixed position inside the tubing. A magnetizable plunger having a conical downstream end is set just upstream of the fixed plate. The plunger contains internal or external passageways along its length to permit passage of refrigerant fluid. When the plunger moves downstream, the conical downstream end enters the central orifice of the fixed plate and forms a closed valve. When the plunger moves upstream, the conical downstream end separates from the fixed plate and refrigerant fluid may flow freely. A line of a circuit wherein the voltage changes in magnitude and direction depending on the temperature difference between the expansion coils and the condensing coils in the refrigeration system is coiled about the tubing over the magnetizable plate. Another line which carries a constant dc voltage is coiled about the tubing over the plunger. If the coil wound around the tubing over the fixed plate causes the plate to develop a magnetic pole that is the same as that of the plunger, the movable plunger will be moved away from the fixed plate and the valve will be opened. If the coil wound around the tubing over the magnetizable fixed plate causes the plate to develop a magnetic pole which is opposite that of the plunger, the plunger and the fixed plate are attracted and the orifice is closed, shutting off the valve. This valve system can be used with liquid or gaseous refrigerant.

DESCRIPTION OF THE PREFERRED EMBODIMENTS

The present invention will now be described with reference to the above drawings, like numerals referring to like features throughout.

Figure 1:
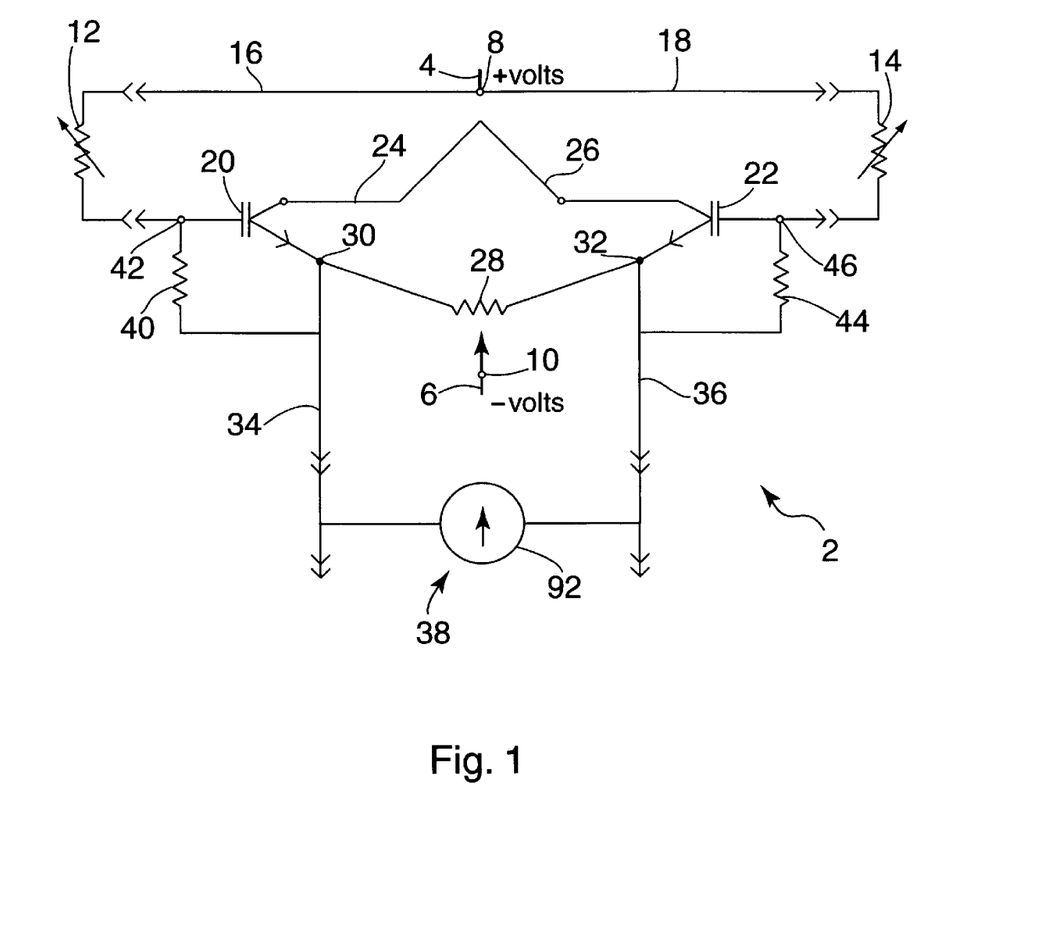
FIG. 1. is a schematic drawing of the first circuit of the present invention in combination with a meter.
Figure 2:
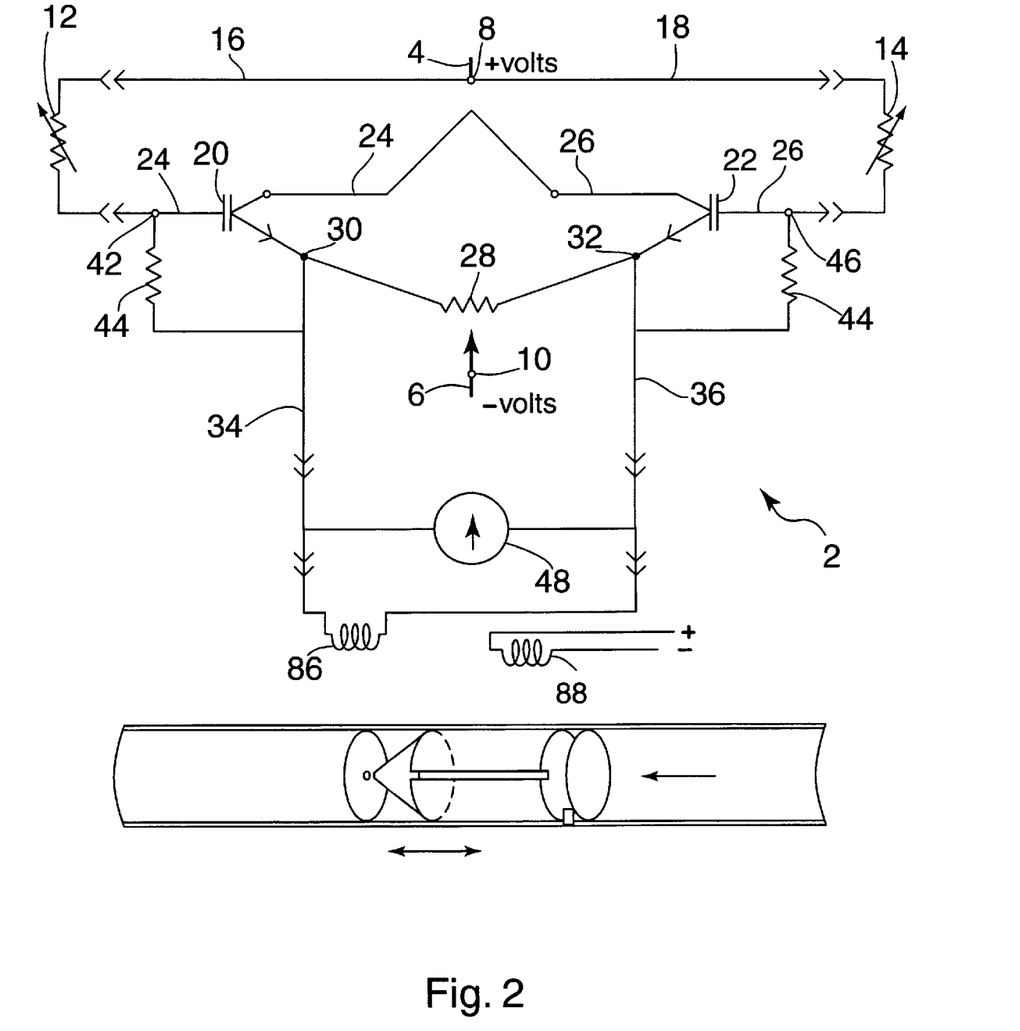
FIG. 2 is a schematic drawing of the first circuit of the present invention in combination with a valve.
Figure 3:
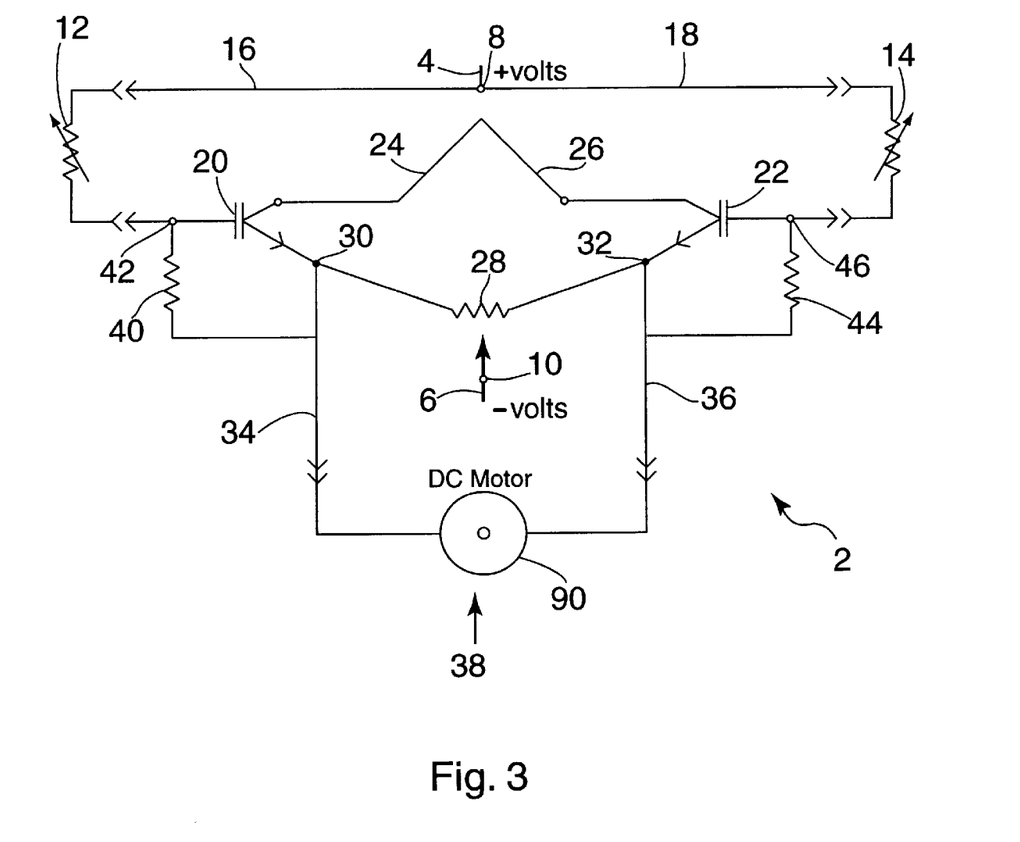
FIG. 3 is a schematic drawing of the first circuit of the present invention in combination with a dc motor.

The first temperature comparison circuit 2 of the present invention and its operation will be discussed with reference to FIGS. 1–3.

The first temperature comparison circuit 2 comprises a source 4 of positive voltage and a source 6 of negative voltage. Each of these sources 4 6 is connected to a connector 8 10 which is adapted to be connected to a current source. First 12 and second thermistors 14 are coupled to the source 4 of positive voltage by direct lines 16 18.

First 20 and second high-gain NPN transistors 22, each transistor 20 22 having a collector, an emitter, and a base, are coupled correspondingly between the first and second thermistors 12 14 and the positive connector 8 by corresponding first 24 and second lines 26, the collector of each transistor 20 22 being coupled with the positive connector 8. A potentiometer 28 is coupled between the emitters of the first and second NPN transistors 20 22 and also to the source 6 of negative voltage via a connector 10.

There is a first connection point 30 between the first NPN transistor 20 and the potentiometer 28. There is a corresponding second connection point 32 between the second NPN transistor 22 and the potentiometer 28.

A third line 34 runs from the first connection point 30 and a fourth line 36 runs from the second connection point 32. The third 34 and fourth lines 36 are adapted to be connected to a piece of electrical equipment 38 which is sensitive to changes in the magnitude and direction of the voltage.

There is a first fixed-value resistor 40 coupled between the first line 24 at a point 42 which is between the first thermistor 12 and the first NPN transistor 20 and the third line 34, In like fashion, there is a second fixed-value resistor 44 coupled between the second line 26 at a point 46 which is between the second thermistor 14 and the second NPN transistor 22 and the fourth line 36.

In operation, the resistance values of each of the thermistors 12 14 and each of the fixed value resistors 40 44 is selected to get the desired flow from the emitters to the bases of the NPN transistors 20 22. The general temperature range of the points to be compared by the circuit 2 are determined. In this determination, the lowest anticipated temperature will determine the point of resistance used in selecting the thermistors 12 14 and the fixed-value resistors 40 44. The thermistors 12 14 and resistors 40 44 should be selected so that the emitter-to-collector current of the NPN transistors 20 22 are at the threshold of conducting. The potentiometer 28 is used to balance the current flow to each NPN transistor 20 22 to get a desired preset value. Once balanced, the current flow through each of the NPN transistors 20 22 is equal when the temperatures between the thermistors 12 14 are at the preset temperature. The adjustable contact of the potentiometer 28 is connected to the negative supply voltage 6 by a connector 10. The thermistors 12 14 are connected to the positive voltage power supply 4 by a connector 8.

If the thermistors 12 14 are at the desired preset temperature and the potentiometer 28 is adjusted to allow equal current flow through the NPN transistors 20 22, the bridge is balanced. In this condition, there is no current through the third 34 and fourth lines 36. An "O" center meter 48 measures the current flow and polarity of the electric current between the third 34 and fourth lines 36.

If the first thermistor 12 becomes warmer than the second thermistor 14, the current through the first NPN transistor 20 will increase and the bridge will no longer be balanced. This will increase the voltage in the third line 34 over that of the fourth line 36, causing the "O" center meter 48 to deflect to a varying degree as the temperature of the first thermistor 12 increases or decreases relative to the temperature of the second thermistor 14.

Should the temperature of the second thermistor 14 become warmer than the temperature of the first thermistor 12, the bridge becomes unbalanced in the opposite direction. This causes the voltage in the fourth line 36 to become greater than the voltage in the third line 34, causing the "O" center meter 48 to deflect in the opposite direction.

Figure 4:
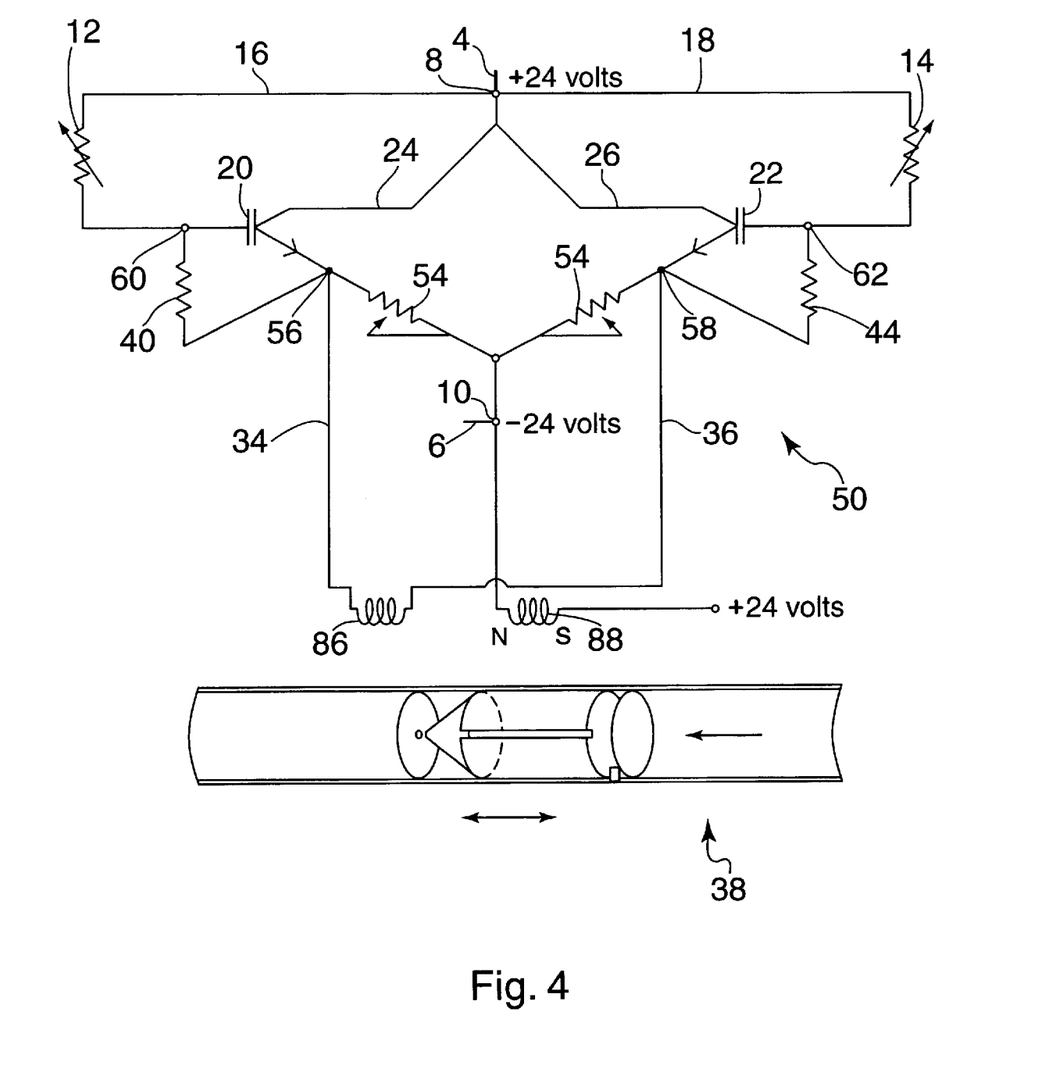
FIG. 4 is a schematic drawing of the second circuit of the invention in combination with a valve.

The second temperature comparison circuit of the present invention and its operation will be discussed with reference to FIG. 4.

The second temperature comparison circuit 50 comprises a source of positive voltage 4 and a source of negative voltage 6. Each of these sources 4 6 is connected to a connector 8 10 which is adapted to be connected to a current source 4 6. First and second thermistors 12 14 are coupled to the source of positive voltage 4 by direct lines 16 18.

First 20 and second high-gain NPN transistors 22, each transistor 20 22 having a collector, an emitter, and a base, are coupled correspondingly between the first 12 and second thermistors 14 and the positive connector 8 by corresponding first 24 and second lines 26, the collectors of the NPN transistors 20 22 being coupled with the positive connector 8.

There are first 52 and second power resistors 54 coupled between the emitters of the corresponding first 20 and second NPN transistors 22 and the negative power source 6 by a connector 10.

There is a first connection point 56 between the first NPN transistor 20 and the first power transistor 52, There is a second connection point 58 between the second NPN transistor 22 and the second power transistor 54.

A third line 34 runs from the first connection point 56 and a fourth line 36 runs from the second connection point 58. The third 34 and fourth lines 36 are adapted to be connected to a piece of electrical equipment 38 which is sensitive to a change in the magnitude or direction of voltage.

There is a first fixed-value resistor 40 coupled between the first line 24 at a point 60 between the first thermistor 12 and the first NPN transistor 20 and the first connection point 56.

There is a second fixed-value resistor 44 coupled between the second line 26 at a point 62 between the second thermistor 14 and the second NPN transistor 22 and the second connection point 58.

In operation, the thermistors 12 14 are placed in areas having potentially different temperatures. When there is a set, desired difference of temperatures, different voltages are supplied from the positive current source 4 to the negative current source 6 through the thermistors 12 14, NPN transistors 20 22, and power resistors 52 54. The power resistors 52 54 have adjustments or taps that will assist in balancing the bridge. This current is biased by using the power resistors 52 54 to provide equal voltages to balance the bridge. Under this condition, there is no current flow through the third 34 and fourth lines 36. When the temperature differences between the thermistors 12 14 changes from the original, preset value, the bridge becomes unbalanced. This causes a current flow between the third 34 and fourth lines 36 which is proportional to the magnitude of temperature change and the direction of the current flow is determined by the relative temperatures of the thermistors 12 14. That is, if the first thermistor 12 is warmer than the second 14, current will flow in one direction. If, on the other hand, the second thermistor 14 is warmer than the first 12, current will flow in the opposite direction.

If, following balancing of the bridge, the temperature of the first thermistor 12 increases, the first current flowing through the first NPN transistor 20 will increase. This will cause the current at the first connection point 56 to become more negative in voltage than that at the second connection point 58. Thus, there will be a current flow from the first connection point 56 to the second connection point 58.

The circuits 2 50 of this invention will operate with any standard dc voltage, although for many of the intended uses, 24 volts is preferred.

Figure 5:
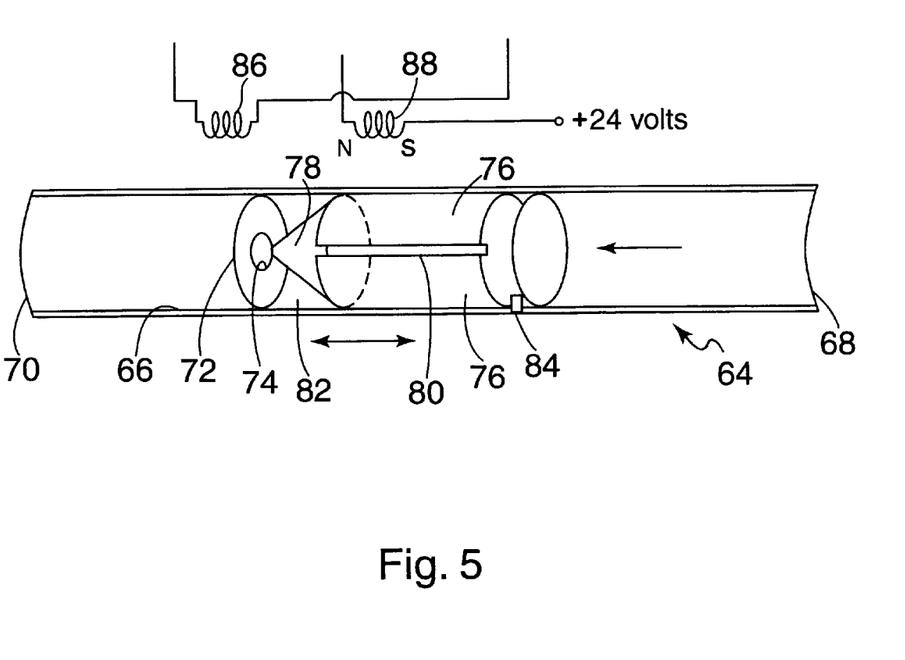
FIG. 5 is a schematic drawing of an expansion valve according to this invention.

The expansion valve 64 of this invention and its operation will be described with reference to FIGS. 2, 4, and 5.

Another feature of this invention is an expansion valve 64 for refrigerator systems which may be operated by the above-described circuitry 2 50. For this utility, one of the thermistors 12 in an above-described circuits 2 50 is placed on the refrigeration evaporation coils and the other thermistor 14 is placed on the condensing coils. When the compressor is running, there is a substantial difference in temperature between the condensing coils and the evaporator coils. It is this difference in temperature which is desired to be monitored in order to control the flow of refrigeration fluid by use of the expansion valve 64. With the compressor running, the bridge is balanced to yield a preset value. Subsequently, when the difference in temperatures between the condensing coils and evaporator coils changes, the bridge will become unbalanced. This causes a current flow having a magnitude and direction which depends upon the relative temperatures of the thermistors 12 14.

Non-magnetic tubing 66 having an upstream end 68 and a downstream end 70 which tubing 66 is part of the refrigeration system, is fitted with a fixed magnetizable plate 72. The plate 72 may be flat or conical in shape. The plate 72 contains a central orifice 74 which is of such a size as to allow sufficient fluid to pass when the orifice 74 is not obstructed. A magnetizable plunger 76 containing a conical downstream end 78 is positioned just upstream of the fixed plate 72. When the plunger 76 is moved downstream, the conical end 78 enters the central orifice 74 of the fixed plate 72 to close the valve 64. When the plunger 76 is moved upstream, the conical downstream end 78 is removed from the central orifice 74 of the fixed plate 72 to open the valve 64. The plunger 76 is equipped with at least one longitudinal groove 80 along the outside surface of the plunger 76 from the upstream end 68 to the downstream end 70 or at least one noncentral bore running lengthwise through the plunger 76 to allow passage of fluid to the space 82 between the plunger 76 and the fixed plate. 72 A retaining washer or ring 84 is fixed in a position upstream of the plunger 76 to limit the movement of the plunger 76.

A first electrical coil 86 having a flow of dc electricity which is responsive to the temperature differences between the evaporator coils and the condensation coils is wound around the tubing 66 over the magnetizable plate 72. As the temperature difference between these two portions of the refrigeration system changes, the first coil 86 will respond by changing in magnitude and direction of current passing through it. A second electrical coil 88 having a constant flow of a dc electrical current having a uniform voltage is wound around the tubing 66 over the magnetizable plunger 76. Thus, if the fixed plate 72, in response to a voltage change in the first coil 86, develops a magnetic pole that is the same as the plunger, 76 the movable plunger 76 will be moved away from the fixed plate 72 and the valve 64 will be opened. If the magnetizable fixed plate 72, in response to a voltage change in the first coil 86, develops a magnetic pole which is opposite that of the plunger 76, the plunger 76 and the fixed plate 72 are attracted and the orifice 74 is closed, shutting off the valve 64. It is in this way that the circuits 2 50 and expansion valve 64 of this invention cooperate to control the temperature of a refrigeration system. This valve 64 system can be used with liquid or gaseous refrigerant. While this valve 64 has been described in connection with a refrigeration system, its intended use is not limited to such a system. The valve 64 may be used in any system in which a difference in temperatures at two separate points is desired to control the flow of fluids in that system.

The temperature comparison circuits 2 50 of the present invention lend themselves to a variety of uses. Basically, all that is required in order for these circuits 2 50 to be useful is a difference of temperatures between two points and a piece of electrical equipment 38 which is sensitive to the magnitude and direction of voltage which is created in the circuits 2 50 by the difference in temperature (or change in temperature from a preset value).

One example of utility is the refrigeration expansion valve 64 which has just been described.

Another example is the use in frost insulation control in refrigeration systems. The inventor has determined that frost which forms on the coils in a humid climate is less insulative than frost in a dry climate. Light fluffy frost that forms in dry areas will somewhat insulate the coils from proper removal of the heat in a refrigerator. This could cause the temperature to warm enough to spoil food in parts of the refrigerated container. Hard ice that forms in a humid area would be less insulative, allowing the coils to remove more heat. Thus, one utility of the circuits 2 50 of this invention is to monitor the insulative condition of the frost that forms on the coils. One of the thermistors 12 is placed on the coils and the other thermistor 14 is placed free inside the refrigerated container. When the compressor of the refrigerator unit is running, the temperature of the thermistor 12 on the coils reaches a preset difference between the temperature of the thermistor 14 which is free in the refrigerated container. As ice accumulates on the coils, the temperature difference between the thermistors 12 14 changes. When the temperature difference reaches a preset value, the circuit 2 50 initiates a motor 90 which starts the defrosting process.

As the circuits 2 50 of the present invention allow for current flow in both directions along a line, one of the unique uses of these circuits 2 50 is in operating a motor 90 which will operate in either a clockwise direction or counterclockwise direction depending on the direction of current flow. As an example of this utility, should the first thermistor 12 increase in temperature compared to the second thermistor 14 from a preset value, the circuits 2 50 operate to turn a motor 90 in one direction to open louvers. Should the first thermistor 12 decrease in temperature compared to the second thermistor 14 from a preset value, the circuits 2 50 operate to turn a motor 90 in the opposite direction to close the louvers.

Other uses contemplated by the inventor are the monitoring with the use of a meter 92. The circuits 2 50 may be used to monitor the condition of cooling and heating systems. Thus, the comparison of air temperature entering a heating or cooling system with the air temperature leaving the system aids the determination of the efficiency of the system and the comparison the air temperature at one point in a heating or cooling system ducting with the air temperature at a point further along the ducting aids in the determination of the condition of the ducting. Another utility is the operation of a mixing valve for liquids or gases of different temperatures. Also, the inventor contemplates an additional utility in the comparison of temperatures at two different parts of a mammalian body for diagnostic or educational purposes.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. Temperature comparison circuitry comprising: positive and negative connectors adapted to be connected to a supply of positive and negative electrical power;

a first thermistor coupled to the positive connector;

a second thermistor coupled to the positive connector;

a first high-gain NPN transistor having a collector, an emitter, and a base coupled between the first thermistor and the positive connector by a first line, the collector of the transistor being coupled with the positive connector;

a second high-gain NPN transistor having a collector, an emitter, and a base coupled between the second thermistor and the positive connector by a second line, the collector of the transistor being coupled with the positive connector; a potentiometer coupled between the emitters of the first and second NPN transistors and coupled to the negative connector;

a first connection point between the first NPN transistor and the potentiometer;

a second connection point between the second NPN transistor and the potentiometer;

a third line running from the first connection point;

a fourth line running from the second connection point, which third and fourth lines are adapted to be connected to a piece of electrical equipment which is sensitive to a change in voltage;

a first fixed-value resistor coupled between the first line at a point between the first thermistor and the first NPN transistor and the third line; and a second fixed-value resistor coupled between the second line at a point between the second thermistor and the second NPN transistor and the fourth line.

2. A temperature comparison circuit, wherein the connectors of the temperature comparison circuitry of claim 1 are connected to supplies of positive and negative electrical power.

3. A temperature comparison circuit, wherein the temperature comparison circuit of claim 2 is connected to a piece of electrical equipment which is sensitive to a change in voltage.

4. The temperature comparison circuit of claim 3, wherein the piece of electrical equipment which is sensitive to a change in voltage is a dc motor which supplies directional turning which is a function of the polarity of the current supplied to the motor.

5. The temperature comparison circuit of claim 3, wherein the piece of electrical equipment which is sensitive to a change in voltage is a meter which measures current flow and polarity of electric current.

6. The temperature comparison circuit of claim 3, wherein the piece of electrical equipment which is sensitive to a change in voltage is an expansion valve.

7. A refrigeration control system for a refrigerator system having evaporator and condensing coils, which system comprises the temperature comparison circuit of claim 6 wherein one thermistor is in contact with the evaporator coils and the other thermistor is in contact with condensing coils, the expansion valve comprising:

a non-magnetizable tube which is part of the refrigeration system having an upstream end and a downstream end for flow of refrigeration fluid;

the tube containing a fixed magnetizable plate which contains a central orifice;

the tube containing a movable magnetizable plunger upstream from the magnetizable plate, which movable magnetizable plunger contains a conical downstream end which fits into the central orifice of the magnetizable plate to form a closed valve, the movable magnetizable plunger further containing at least one longitudinal passageway to allow for the passage of fluid;

the tube containing a fixed stop upstream of the movable magnetizable plunger to limit the movement of the plunger; and wherein the temperature comparison circuit of claim 6 is so related to the expansion valve that:

the third and fourth lines of the temperature comparison circuit are connected to form a circuit line and the line is coiled around the tube at the point of the fixed magnetizable plate, which line contains a current which varies depending upon the difference in temperature detected by the two thermistors, and a line of a circuit having a constant dc voltage is coiled around the tube over the plunger.

8. Temperature comparison circuitry comprising:

positive and negative connectors adapted to be connected to a supply of positive and negative electrical power;

a first thermistor coupled to the positive connector;

a second thermistor coupled to the positive connector;

a first high-gain NPN transistor having a collector, an emitter, and a base coupled between the first thermistor and the positive connector by a first line, the collector of the transistor being coupled with the positive connector;

a second high-gain NPN transistor having a collector, an emitter, and a base coupled between the second thermistor and the positive connector by a second line, the collector of the transistor being coupled with the positive connector;

a first power resistor coupled between the emitter of the first NPN transistor and the negative connector;

a second power resistor coupled between the emitter of the second NPN transistor and the negative connector;

a first connection point between the first NPN transistor and the first power transistor;

a second connection point between the second NPN transistor and the second power transistor;

a third line running from the first connection point;

a fourth line running from the second connection point, which third and fourth lines are adapted to be connected to a piece of electrical equipment which is sensitive to a change in voltage;

a first fixed-value resistor coupled between the first line at a point between the first thermistor and the first NPN transistor and the first connection point; and a second fixed-value resistor coupled between the second line at a point between the second thermistor and the second NPN transistor and the second connection point.

9. A temperature comparison circuit, wherein the connectors of the temperature comparison circuitry of claim 8 are connected to supplies of positive and negative electrical power.

10. A temperature comparison circuit, wherein the temperature comparison circuit of claim 9 is connected to a piece of electrical equipment which is sensitive to a change in voltage.

11. The temperature comparison circuit of claim 10, wherein the piece of electrical equipment which is sensitive to a change in voltage is a dc motor which supplies directional turning which is a function of the polarity of the current supplied to the motor.

12. The temperature comparison circuit of claim 10, wherein the piece of electrical equipment which is sensitive to a change in voltage is a meter which measures current flow and polarity of electric current.

13. The temperature comparison circuit of claim 10, wherein the piece of electrical equipment which is sensitive to a change in voltage is an expansion valve.

14. A refrigeration control system for a refrigerator system having evaporator and condensing coils, which system comprises the temperature comparison circuit of claim 13 wherein one thermistor is in contact with the evaporator coils and the other thermistor is in contact with condensing coils, the expansion valve comprising:

a non-magnetizable tube which is part of the refrigeration system having an upstream end and a downstream end for flow of refrigeration fluid;

the tube containing a fixed magnetizable plate which contains a central orifice;

the tube containing a movable magnetizable plunger upstream from the magnetizable plate, which movable magnetizable plunger contains a conical downstream end which fits into the central orifice of the magnetizable plate to form a closed valve, the movable magnetizable plunger further containing at least one longitudinal passageway to allow for the passage of fluid;

the tube containing a fixed stop upstream of the movable magnetizable plunger to limit the movement of the plunger; and wherein the temperature comparison circuit of claim 13 is so related to the expansion valve that:

the third and fourth lines of the temperature comparison circuit are connected to form a circuit line and the line is coiled around the tube at the point of the fixed magnetizable plate, which line contains a current which varies depending upon the difference in temperature detected by the two thermistors, and a line of a circuit having a constant dc voltage is coiled around the tube over the plunger.

15. A tube in a refrigeration system having evaporator coils and condensing coils in combination with an expansion valve, the valve comprising:

a non-magnetizable tube which is part of a refrigeration system having an upstream end and a downstream end for flow of refrigeration fluid;

the tube containing a fixed magnetizable plate which contains a central orifice;

the tube containing a movable magnetizable plunger upstream from the magnetizable plate, which movable magnetizable plunger contains a conical downstream end which fits into the central orifice of the magnetizable plate to form a closed valve, the movable magnetizable plunger further containing at least one longitudinal passageway to allow for the passage of fluid;

the tube containing a fixed stop upstream of the movable magnetizable plunger to limit the movement of the plunger; and wherein a temperature comparison circuit is so related to the expansion valve that:

a line which contains a voltage which varies in magnitude and direction depending on differences in temperature between the evaporator coils and the condensing coils is coiled around the tube at the point of the fixed magnetizable plate, and a line of a circuit having a constant dc voltage is coiled around the tube over the plunger.

* * * * *